United States Patent Office 3,511,169
Patented May 12, 1970

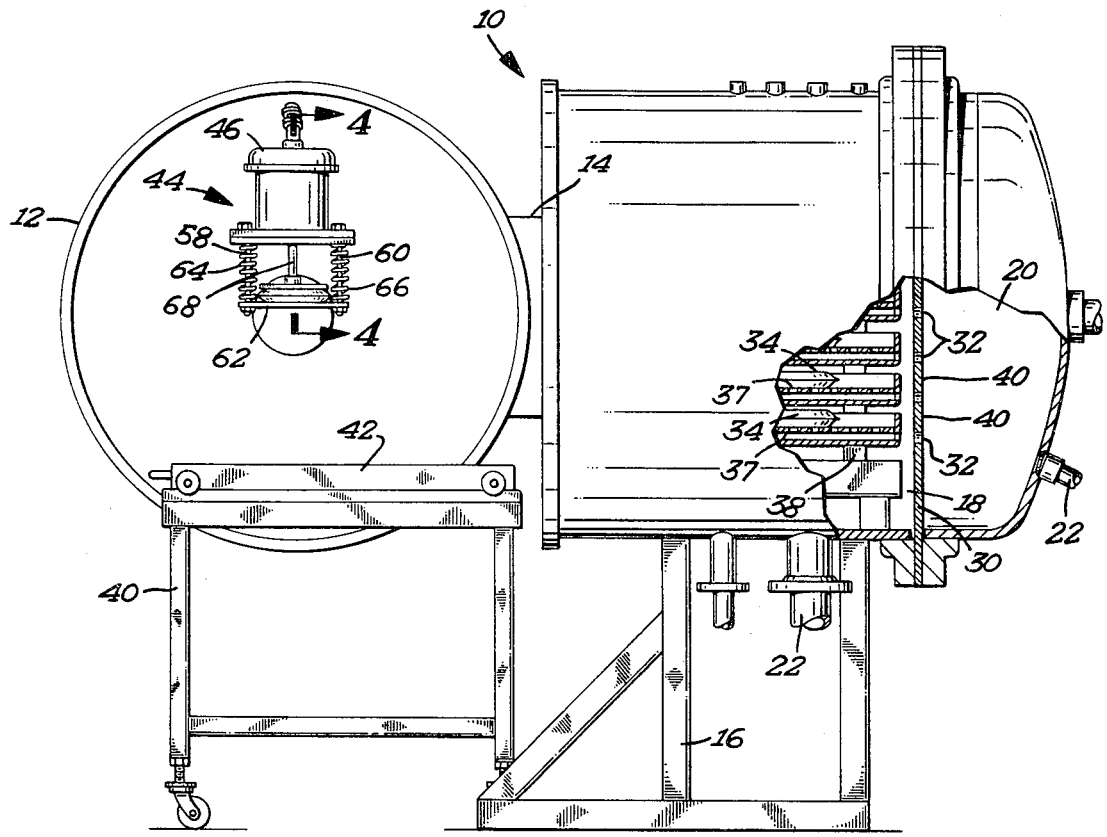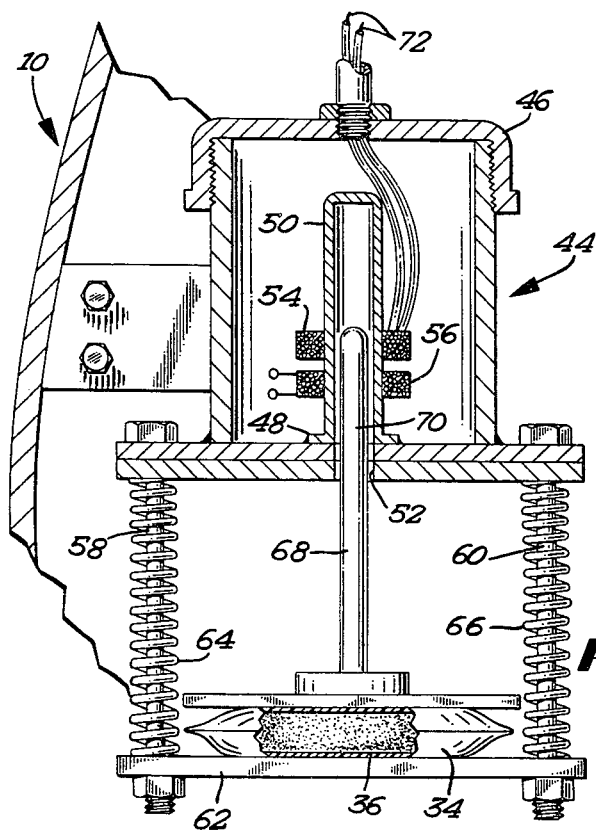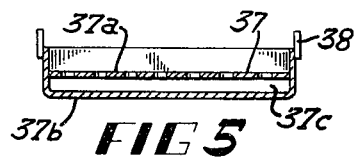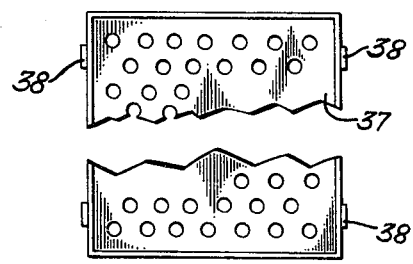

3,511,169
PRESSURE COOKING APPARATUS

Edward L. Fritzberg and Selwyn Jones, Minneapolis, Minn., assignors to The Pillsbury Company, Minneapolis, Minn., a corporation of Delaware
Filed Mar. 14, 1966, Ser. No. 534,994
Int. Cl. A23l 3/10
U.S. Cl. 99—370                                1 Claim

ABSTRACT OF THE DISCLOSURE

An apparatus for cooking articles such as plastic pouches that can be damaged by pressure. The apparatus is composed of a vessel having a mixing compartment for a heat transfer medium (usually water) and a processing chamber adapted to hold trays upon which the articles are supported. Water at a precisely controlled temperatures is circulated continuously from the mixing chamber to the processing chamber through a plurality of openings within a plate separating the chambers. The trays are positioned in alignment with the openings. The water after leaving the processing chamber passes through a heat exchanger and is returned to the mixing chamber. Pouch expansion is sensed and used to control air pressure within the vessel to prevent excessive expansion of the pouches.

---

The present invention relates to a cooking apparatus and more particularly to an apparatus for cooking food materials packaged in flexible packaging material.

According to a known method of cooking food products described in the co-pending patent application entitled "Baking Process, Apparatus and Product Formed Thereby" and bearing Ser. No. 411,777, an overriding pressure is applied to compensate for the pressure generated within the package in which the food product is placed. In this prior system, a food product is placed within a package, the package is hermetically sealed and heated to a temperature sujcient to generate a gas or vapor within the package. The package may or may not be evacuated before sealing. As the package is heated, it is allowed to expand to a prescribed volume. The volume is then maintained essentially constant by applying sufficient external pressure to counteract the further expansion of the package so that the walls of the package will not be deflected beyond the point at which they rupture.

In one form of the prior process, the externally applied pressure is gradually increased as the temperature within the package increases responsive to the transfer of heat thereto. While retained under pressure, the heating of the package is discontinued and the package is cooled. During the cooling operation, the pressure is gradually changed as the package and its contents are cooled and the package volume has a tendency to decrease.

The prior process is carried out in an apparatus including a receptacle such as a retort or autoclave in which the food product is heated to a relatively high temperature. The heat is thereafter quickly removed from the cooked food to prevent degradation of the product from exposure to these temperatures. In one form of the process, the food is first heated to a temperature sufficient high to sterilize it and then cooled sufficiently to prevent product degradation.

A considerable amount of time was required in the prior process for introducing and removing food products from the cooking vessel. In addition, the temperature of the fluid heating medium varied throughout the different parts of the vessel and although provision was made for agitating the fluid heating medium in the vessel, some variations in temperature throughout the different parts of the vessel still occurred resulting in different degrees of expansion of the packages which is, of course, undesirable. The seals employed in the packages are often thermoplastic in nature and they are accordingly weakened by exposure to heat and consequently will burst open when a nominal differential pressure across their walls is present.

A further shortcoming of the prior device was the exposure of the parts of the pressure sensor to the fluid heating medium which necessitated carefully sealing the sensor and caused an occasional malfunctioning of the sensor due to exposure to water and heat.

In view of the deficiencies of the prior art, it is one object of the present invention to provide an improved food pressure cooking apparatus wherein a means is provided for reliably maintaining the fluid heating medium within the cooking apparatus at a uniform pressure and temperature to prevent the packages from bursting.

Another object is to uniformly mix and adequately distribute the mixed fluid heating medium throughout the entire vessel to thereby evenly expose all of the packages containing the food products being cooked to a fluid heating medium at the same temperature.

A further object of the invention is the provision of an improved apparatus of the type described with a means for hermetically sealing the pressure sensor employed for detecting the expansion of the packages.

A further object of the invention is the provision for readily introducing and removing the food products from the vessel.

These and other objects of the invention will be apparent from the following specification and drawings wherein:

FIG. 3 is a side elevational view partly broken away of the cooking vessel employed in the invention.

FIG. 4 is a partial vertical sectional view of the pressure sensor in accordance with the invention.

FIG. 5 is an end elevational view of a preferred form of food retaining tray in accordance with the invention.

FIG. 6 is a plan view of the food holding tray in accordance with the invention.

The invention will now be briefly described.

A food product packaged in a flexible packaging material is introduced into a cooking vessel. The vessel is filled with a fluid heating medium, the fluid heating medium is circulated through the vessel to distribute the heat evenly so that the packaged food products are uniformly heated through the vessel, pressure changes within the food product packages are sensed and a compensating pressure is continuously applied within the vessel to limit the expansion of the packages. The fluid heating medium is cooled by refrigeration following the circulation through the vessel in order to cool the packages at a predetermined rate. The fluid heating medium is then removed from the vessel. Next, the compensating pressure is removed and the packages are withdrawn from the vessel.

In one preferred form of practicing the invention, said fluid heating medium is heated until a predetermined temperature is reached, thereafter said fluid heating medium is maintained at a constant temperature for a predetermined period of time, next fluid heating medium is cooled until a predetermined lower temperature is reached and finally the fluid heating medium is removed from the vessel.

The apparatus includes a vessel having a removable closure for introducing food products, ducts for introducing a fluid heating medium therein, a means for heating and circulating the fluid heating medium through the vessel to evenly distribute the fluid heating medium throughout the vessel whereby the temperature of the fluid heating medium will be uniform throughout the vessel. The vessel preferably includes a provision such as a plate for dividing the vessel into product processing and mixing portions and a provision for uniformly distributing the fluid from the mixing chamber to the processing chamber.

Figure 1:
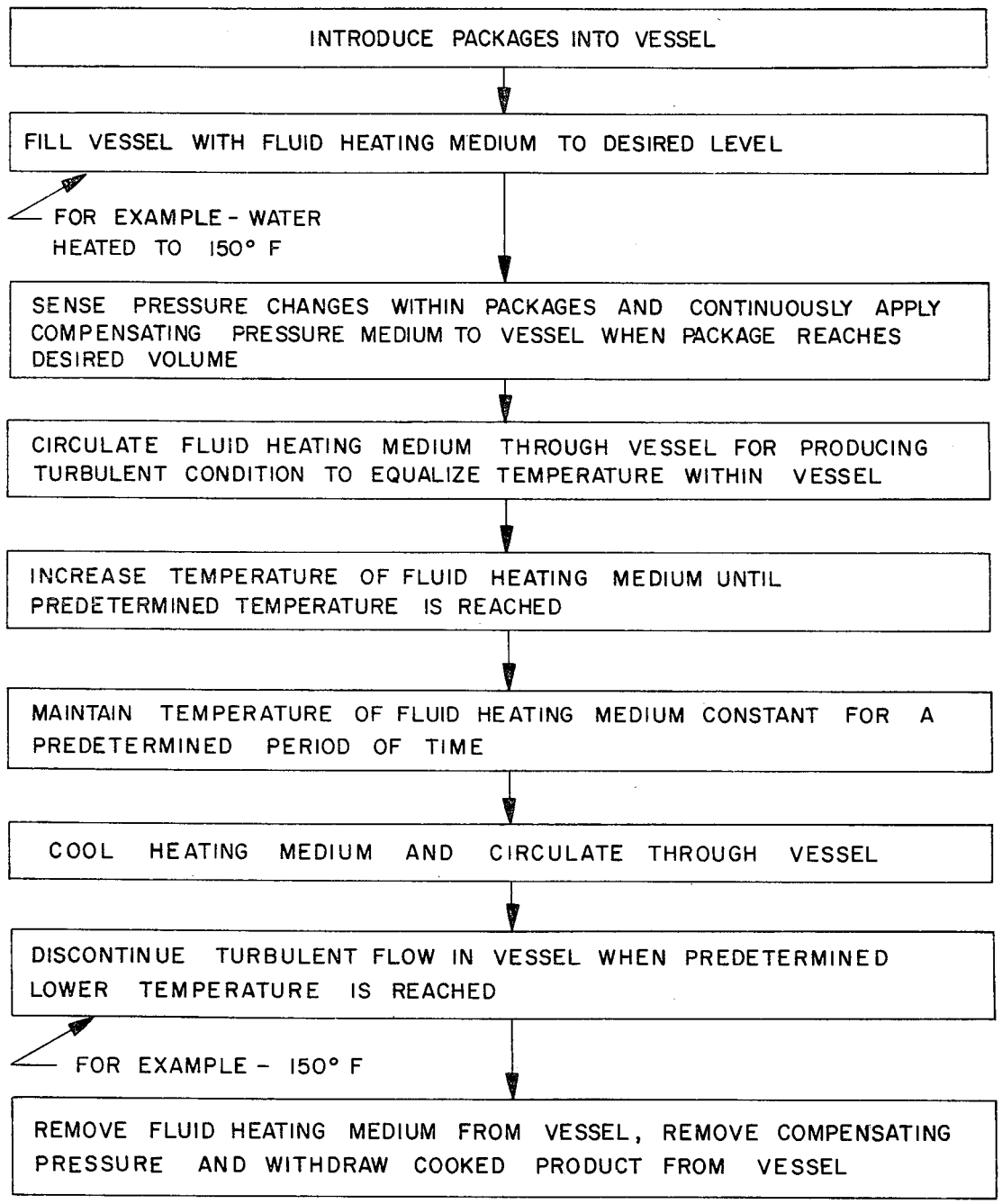
FIG. 1 is a flow chart illustrating the steps performed in accordance with one preferred form of the invention.
Figure 2:
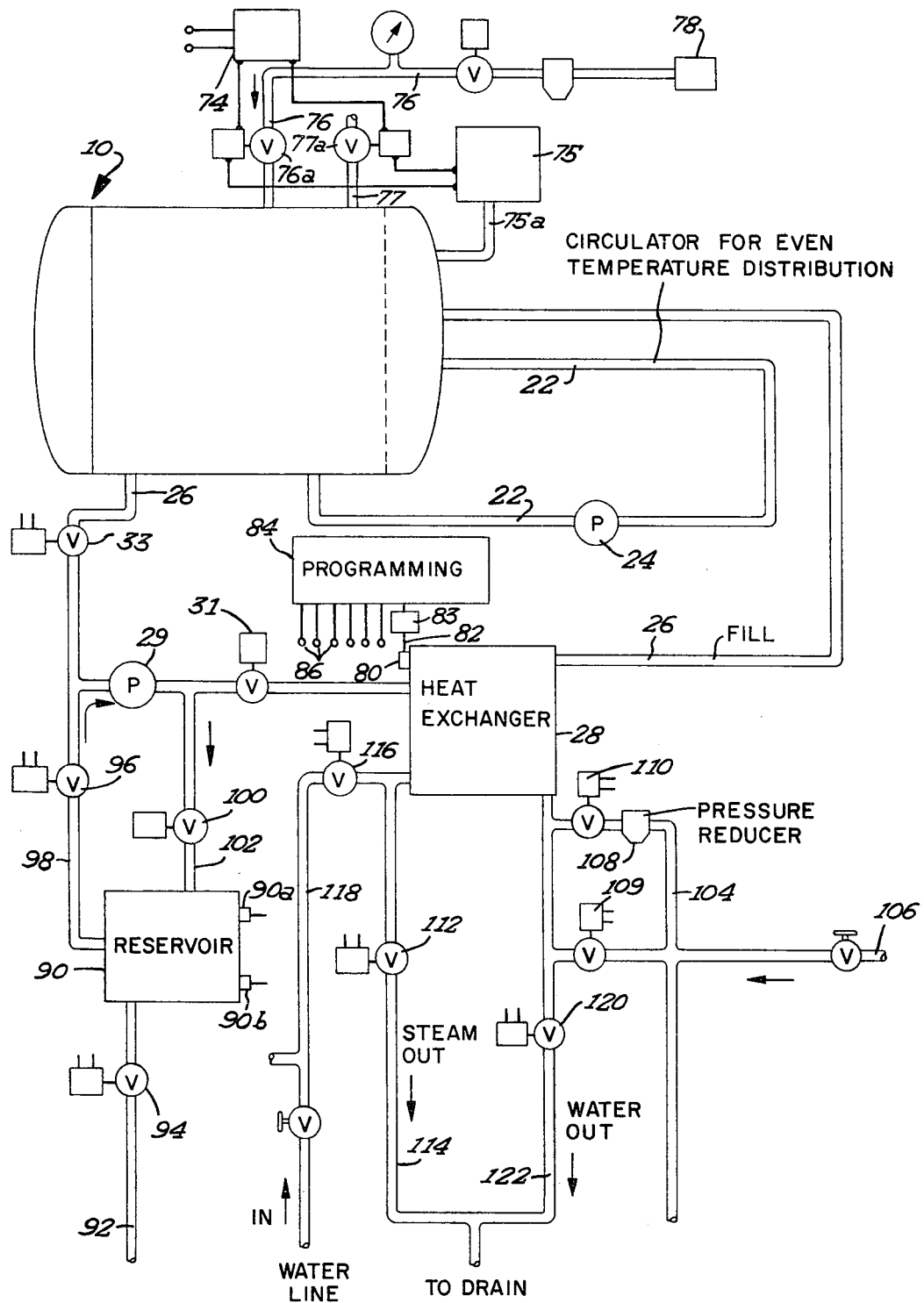
FIG. 2 is a schematic diagram of the control and fluid flow system employed in one preferred form of the invention.

Refer now to the figures and particularly to FIGS. 2–6 which illustrate by way of example a preferred form of the invention. As seen in FIGS. 2 and 3 there is provided a cooking vessel such as a steel retort 10 having a removable closure or cover member 12 secured to the vessel by means of a suitable hinge 14. The retort rests upon a supporting framework 16 and includes a food processing chamber 18 and mixing chamber 20 connected in series by means of a line 22 with a circulating pump 24 and by means of a line 26 with a heat exchanger 28, a circulating pump 29 and valves 31 and 33. Positioned within the vessel 10 between the mixing chamber and the processing chamber and between the corresponding ends of the ducts 22 and 26 is a flow control member 30 such as a metal sheet having a plurality of vertically spaced apart laterally extending distribution openings such as slots 32.

As can be clearly seen in FIGS. 3, 5 and 6, there is provided a plurality of food containing packages 34 formed from a flexible sheet material such as a laminate composed of a thermoplastic film material such as polyvinylchloride in a metal foil such as aluminum foil. The food product is designated 36. The packages 34 are arranged in vertically or horizontally spaced layers. The layers are in this instance stacked on top of one another and spaced uniformly by the provision of a plurality of stacked trays 37 and upper and lower plates 37a and 37b. The trays 37 are held in a slightly spaced stacked position by the provision of tabs 38 welded to the side of each tray. Openings 37c between the plates 37a and 37b of tray 37 are positioned in exact alignment with the openings 32 in the flow control plate 30. By this provision, the fluid cooling medium which will normally consist of water is fed through the heat exchanger 28 and circulated by means of the circulating pumps 24 and 29, mixed uniformly within chamber 20 and evenly distributed over and under the packages 34 to reliably maintain each of the packages throughout the vessel at very close to the same temperature.

Food packages can be carried to the vessel in any suitable article handling device such as a cart 40 having a carriage 42 supported upon wheels and adapted to be transferred into and out of the vessel 10.

Within the vessel 10 and mounted rigidly upon the door 12 is a pressure sensor indicated generally at 44 consisting of a hermetically sealed housing 46 within which is rigidly fastened as by welding 48 a thin walled tube 50 formed from a non-magnetic material such as non-magnetic stainless steel. The upward end of tube 50 is closed. The lower end is hermetically sealed to the housing by welding 48 and communicates with a bore 52 in the lower wall of the housing 46. Mounted upon the tube 50 is a sensing means such as a pair of coils 54 and 56. The sensing means can comprise any of a variety of linear voltage differential transformers commercially available. Below the housing 46 and supported upon slide members such as downwardly extending rods 58 and 60 is a plate 62 upon which is mounted one of the packages 34 that is to be cooked. The plate 62 is slidably mounted upon the rods 58 and 60 and yieldably biased in a downward direction by means of springs 64 and 66. Resting upon the upward surfaces of the package 34 is a movable sensing member 68 having an upward extension formed from a magnetic material 70 which is slidably mounted within the bore 52 and tube 50. When an alternating current is connected to the coil 56, the upward and downward movement of the member 68 and 70 will change the magnetic induction coupling between the coils 54 and 56. The current induced in the coil 54 is carried by means of conductors 72 to a pressure controller 74 (FIG. 2) wired to a valve 76a in a line 76 and to a valve 77a in a pressure exhaust line 77. The line 76 is connected to a source of compressed gas 78 for providing overriding gas pressure within the vessel 10 in proportion to the amount of expansion within the package 34.

During operation, when the movable member 68 is raised, the induction coupling between coils 54 and 56 will change to produce a current in the conductor 72 that will cause the regulator 74 to open valve 76a thereby providing a gas pressure great enough within the chamber 10 to prevent the package 34 from being ruptured. Correspondingly, if the package 34 within the cage as seen in FIG. 4 decreases in volume, the lowering of the member 68 will decrease the current through line 72 thereby causing the pressure controller 74 to reduce the pressure within the tank 10 by opening valve 77a.

Referring now to FIG. 2, it will be seen that a sensor 80 is provided on the heat exchanger 28. The sensor is connected by means of a conductor 82 to a temperature controller 83. The temperature controller 83 is of any suitable type and is wired to solenoid controlled valves and to a programmer or sequencer 84. The programmer is of any suitable type such as those including a drive motor to which is secured a plurality of cams used for opening and closing the electrical switches. While a variety of programmers can be employed, one suitable programmer is a stepping drum programmer of the type sold by the Tenor Division of the Milwaukee Chaplet Mfg. Co., Milwaukee, Wis. The switches of the programmer are connected to conductors 86 which are in turn suitably wired to the solenoid actuated valves described hereinbelow.

As stated above, the fluid used for filling the vessel 10 ordinarily consists of water. This water is stored in a reservoir 90, the temperature of which is maintained preferably above room temperature, usually at about 120° F. by admitting steam through a line 92. The flow of steam through a line 92 is controlled by a valve 94. The vessel 10 is filled by opening a valve 96 in a line 98 communicating with a water line 26 and operating pump 29. The vessel 10 is emptied by pumping by means of pump 29 through a solenoid operated valve 100 in a line 102. The reservoir 90 includes high and low level sensors 90a and 90b coupled to the programmer 84 by means of suitable conductors so that the circulation of the fluid heating medium through the heat exchanger in line 26 is commenced when the vessel 10 has been filled.

Connected to the heat exchanger 28 is a heating means such as a steam line 104 to which steam is supplied through an inlet 106 and a pressure reducer 108. The flow of steam to the heat exchanger is controlled by a metering valve 109 and 110 wired to the programmer 84. After passing through the heat exchanger, the steam is exhausted through a valve 112 and exhaust line 114. A cooling medium such as tap water is introduced into the heat exchanger when it is desired to cool the heat exchanger medium by opening a valve 116 in water line 118. The water is exhausted by opening a valve 120 in a line 122.

To begin the cooking operation, the packages 34 are distributed on the trays 37 and the trays are stacked within the food storage chamber of the vessel 10. The door 12 is then closed and hermetically sealed in any conventional manner. The valves 31 and 96 are then opened and the pump 29 is started causing the water within the reservoir 90 to pass through line 98 into line 26 and into the mixing chamber 20 and thence to the food product chamber 18 until the vessel 10 is filled. The valve 33 is then opened and the valve 96 closed. The water in the vessel 10 will continue to circulate through the heat exchanger 28. As this is done, the steam is allowed to pass from line 104 into the heat exchanger through valve 110. Valves 109 and 112 are opened allowing the steam to flow out of the heat exchanger. After the vessel 10 has reached the predetermined upper temperature, for example about 250° F., the valve 110 is closed and heating is discontinued. As the temperature is increased, the sensor 44 will compensate for the pressure produced within the packages by the operating of the controller 74 as described hereinabove.

The vessel may then be maintained at a constant temperature over a predetermined period of time. Following this hold period, the valves 116 and 120 are opened allowing water to flow into the heat exchanger through the lines 118 and 122. As this is done, the pumps 24 and 29 continue to circulate the water through the heat exchanger 28. When the heat exchange medium has reached a predetermined lower temperature such as 150° F., the valve 100 is opened and 31 is closed allowing the pump 29 to transfer the water in the vessel 10 to the reservoir 90. Residual pressure, if any, within the vessel 10 is then relieved. The door 12 is then opened and the packages 34 removed.

The invention was found highly effective in cooking food products and in preventing bursting of the packages during the cooking operation.

According to a modified form of our invention, a system is provided for maintaining a constant pressure within the vessel 10 during both the heating and the cooling cycle. This operation can be performed with products which do not generate gas or which have sufficient strength to resist crushing caused by the application of external pressure. Examples of such products are meats, vegetables and liquids such as chow mein and other products which are normally sold in cans.

In accordance with a modified form of the invention, there is provided a pressure controller 75 which can be set manually by the operator to a predetermined established pressure such as 25 pounds per square inch. The controller 75 is suitably wired to solenoid operated valves 76a and 77a. When the predetermined set pressure at the controller 75 is exceeded, the valve 77a is opened releasing air from the vessel 10 until the selected pressure is achieved within the vessel. When the pressure in the vessel 10 is too low, a signal from the controller 75 opens the valve 76a thereby introducing air into the vessel 10 from the line 76. The controller 75 is suitably coupled as by means of a relatively small tube 75a to the vessel 10 for the purpose of detecting the pressure changes within the vessel 10. When the controller 75 is being used, the controller 74 is turned off and will not function.

We claim:

1. An apparatus for cooking flexible packaged food products under pressure comprising in combination a vessel, said vessel having a removable closure for introducing and removing the food products therefrom, a flow control element within the vessel dividing the vessel into a mixing chamber and a food product processing chamber, said flow control element having a plurality of spaced apart openings therein distributed throughout the width and breadth of the food processing chamber to introduce the fluid heating medium into the food product processing chamber across the entire width thereof to produce a laminar flow of the heating medium through the food product processing chamber, a means for introducing the fluid heating medium into the mixing chamber and for forcing the heating medium through the openings in the flow control element, said vessel having an outlet means for exhausting the fluid heating medium therefrom, a means for supplying a compensating overriding pressure to the vessel to prevent excessive expansion of the packages as they are heated whereby the pressure generated by the gas expansion in the packages will be compensated by the applied overriding pressure, a plurality of independent food processing trays, means establishing a predetermined spacing therebetween, an end wall on each tray, inlet opening at the end wall of each tray and a means in the vessel for aligning the end wall openings with the openings in the flow control element such that heating medium that passes through the openings flows through the end of the trays thereby exposing the packages on all of the trays to a substantially uniform flow of heating medium.

References Cited

UNITED STATES PATENTS

| 1,485,133 | 2/1924 | White | 99—214 |
| 2,398,082 | 4/1946 | Cavallito | 99—214 XR |
| 2,472,970 | 6/1949 | Hanna. | |
| 2,564,221 | 8/1951 | Hornfeck | 73—398 XR |
| 2,648,774 | 8/1953 | Whitlock | 137—604 XR |
| 3,037,869 | 6/1962 | Esson et al. | 99—214 XR |
| 3,093,449 | 6/1963 | Kotarski et al. | 99—359 XR |
| 3,308,411 | 3/1967 | Roshala | 73—398 XR |
| 1,186,944 | 6/1916 | Rice | 99—359 |
| 2,082,480 | 1/1933 | Omsted | 126—272 |

FOREIGN PATENTS 809,329   2/1959   Great Britain.

OTHER REFERENCES

Joslyn et al.: Food Processing Operations, vol. 3, pp. 250–252 (1964).

Joslyn et al.: Food Processing Operations, vol. 2, p. 456 (1963).

A. LOUIS MONACELL, Primary Examiner

S. B. DAVIS, Assistant Examiner

U.S. Cl. X.R.

99—214, 448; 21—93